(12) United States Patent
Kazmi et al.

(10) Patent No.: US 10,178,573 B2
(45) Date of Patent: Jan. 8, 2019

(54) METHODS, NETWORK NODE AND WIRELESS DEVICE FOR MANAGING OPERATIONAL BEHAVIOR OF WIRELESS DEVICE AFTER MEASUREMENT GAP

(71) Applicant: Telefonaktiebolaget LM Ericsson (publ), Stockholm (SE)

(72) Inventors: Muhammad Kazmi, Bromma (SE); Joakim Axmon, Kävlinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 301 days.

(21) Appl. No.: 14/380,280

(22) PCT Filed: Jun. 24, 2014

(86) PCT No.: PCT/SE2014/050781
§ 371 (c)(1),
(2) Date: Aug. 21, 2014

(87) PCT Pub. No.: WO2015/122819
PCT Pub. Date: Aug. 20, 2015

(65) Prior Publication Data
US 2016/0242058 A1 Aug. 18, 2016

Related U.S. Application Data

(60) Provisional application No. 61/939,776, filed on Feb. 14, 2014.

(51) Int. Cl.
*H04L 5/00* (2006.01)
*H04W 24/10* (2009.01)
(Continued)

(52) U.S. Cl.
CPC ............. *H04W 24/10* (2013.01); *H04L 5/001* (2013.01); *H04W 72/042* (2013.01);
(Continued)

(58) Field of Classification Search
CPC ............. H04W 24/10; H04W 72/1268; H04W 72/042; H04W 36/0094; H04L 5/001; H04L 5/0053; H04L 5/0048
See application file for complete search history.

(56) References Cited

U.S. PATENT DOCUMENTS

| 2012/0003943 A1* | 1/2012 | Marinier | H04W 36/0083 455/73 |
| 2014/0146697 A1* | 5/2014 | Kim | H04B 7/0413 370/252 |
| 2016/0157116 A1* | 6/2016 | Zhang | H04W 48/16 370/252 |

FOREIGN PATENT DOCUMENTS

WO 2013/172757 A1 11/2013

OTHER PUBLICATIONS

3GPP TS 36.300 v12.0.0 (Dec. 2013) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12) dated Jan. 10, 2014 consisting of 208-pages.
(Continued)

*Primary Examiner* — Walter J Divito
(74) *Attorney, Agent, or Firm* — Christopher & Weisberg, P.A.

(57) ABSTRACT

A network node and a method for managing an operational behavior of a wireless device as well as a wireless device and a method for managing a measurement gap used by the wireless device for performing radio measurements are disclosed. The network node determines the operational behavior of the wireless device in at least one subframe occurring immediately after a measurement gap used by the wireless device for performing radio measurements, wherein the determined operational behavior is based on one or more
(Continued)

criteria relating to a scenario in which the wireless device operates. The network node configures the wireless device according to the determined operational behavior. The wireless device receives, from the network node, a configuration of the operational behavior. The wireless device applies the configuration in the at least one subframe. Moreover, corresponding computer programs and computer program products are disclosed.

18 Claims, 6 Drawing Sheets

(51) Int. Cl.
H04W 36/00 (2009.01)
H04W 72/04 (2009.01)
H04W 72/12 (2009.01)

(52) U.S. Cl.
CPC ....... *H04W 72/1268* (2013.01); *H04L 5/0048* (2013.01); *H04L 5/0053* (2013.01); *H04W 36/0094* (2013.01)

(56) References Cited

OTHER PUBLICATIONS

3GPP TS 36.213 v12.0.0 (Dec. 2013) 3rd Generation Partnership Project; Technical Specification Group Radio Access Network; Evolved Universal Terrestrial Radio Access (E-UTRA); Physical Layer Procedures; (Release 12) dated Dec. 15, 2013 consisting of 186-pages.

International Search Report and Written Opinion dated Nov. 6, 2014 for International Application Serial No. PCT/SE2014/050781, International Filing Date: Jun. 24, 2014 consisting of 16-pages.
Ericsson etal: "UE Behaviour for Transmission after Measurement Gaps in TDD", 3GPP Draft; R4-133916 UE Behaviour for Transmission after Measurement Gaps in TDD, 3rd Generation Partnership Project (3GPP), Mobile Competence Centre; 650, Route des Lucioles; F-06921 Sophia-Antipolis Ce, RAN WG4, Meeting #68, Barcelona, Spain; Aug. 19, 2013-Aug. 23, 2013 (Aug. 12, 2013), Retrieved from the Internet: URL:http://www.3gpp.org/ftp/tsg_ran/WG4_Radio/TSGR4_68/Docs [retrieved on Aug. 12, 2013] consisting of 7-pages.
Ericsson: "UE Behaviour for Transmission due to Measurement Gaps", 3GPP Draft; R4-135196 UE Behaviour for Transmission due to Measurement Gaps, 3rd Generation Partnership Project (3GPP), Mobile Competence Centre; 650, Route des Lucioles; F-06921 Sophia-Antipolis Ce, RAN WG4, Meeting #68bis, Riga, Latvia; Oct. 7, 2013-Oct. 11, 2013 (Sep. 30, 2013), Retrieved from the Internet: URL:http://www.3gpp.org/ftp/tsg_ran/WG4_Radio/TSGR4_68bis/Docs [retrieved on Sep. 30, 2014] consisting of 5-pages.
Ericsson: "UE Behaviour for Transmission due to Measurement Gaps", 3GPP Draft; R4-140737 UE Behaviour for Transmission due to Measurement Gaps, 3rd Generation Partnership Project (3GPP), Mobile Competence Centre; 650, Route des Lucioles; F-06921 Sophia-Antipolis Ce, vol. RAN WG4, Meeting #70, Prague, Czech Republic; Feb. 10, 2014-Feb. 14, 2014 (Feb. 9, 2014), Retrieved from the Internet: URL:http://www.3gpp.org/ftp/Meetings_3GPP_SYNC/RAN/RAN4/Docs/[retrieved on Feb. 9, 2014] consisting of 7-pages.
3GPP TS 36.133 v12.1.0 (Sep. 2013) 3rd Generation Partnership Project; Technical Specificatyion Group Radio Access Network; Evolved Universal Terrestrial Radio Access (E-UTRA); Requirements for Support of Radio Resource Management (Release 12) consisting of 827-pages.

\* cited by examiner

METHODS, NETWORK NODE AND WIRELESS DEVICE FOR MANAGING OPERATIONAL BEHAVIOR OF WIRELESS DEVICE AFTER MEASUREMENT GAP

TECHNICAL FIELD

Embodiments herein relate to wireless communication systems, such as telecommunication systems. A method and a network node for managing operational behavior of a wireless device as well as a method and a wireless device for managing a measurement gap used by the wireless device are disclosed. Moreover, corresponding computer programs and computer program products are disclosed.

BACKGROUND

In the field of wireless communication systems, such as telecommunication systems, it is often desired to manage resources as efficient as possible. The resource may be a radio resource, such as a Resource Block (RB) or the like. In this manner, high data rates may be obtained. One aspect, affecting how to manage resources, concerns a user equipment's relation to its neighboring cells, which e.g. may be determined by performing measurements. Consider a scenario, in which the user equipment (UE) is served by a serving cell at a first frequency. In order for the user equipment to perform measurements on cells at frequencies being different from the first frequency, it may be necessary for the user equipment to interrupt communication with the serving cell. A reason for that the interruption is required is that the receiver and transmitter of the user equipment may only be configured for operation at one frequency, i.e. frequency range, at the time. This interruption is often referred to as a measurement gap, since the user equipment may perform measurements on the others cells during the interruption of communication with the serving cell, which sometimes is referred to as a Primary Cell (PCell). In case of carrier aggregation, (CA) where the user equipment is configured with a PCell and at least one secondary cell (SCell), the interruption of communication may occur on both the PCell and the SCell(s).
Measurements in Long Term Evolution (LTE) Using Gaps As a general rule the user equipment performs inter-frequency and inter-Radio Access Technology (RAT) measurements in measurement gaps unless it is capable of performing them without gaps. To enable inter-frequency and inter-RAT measurements for the UE requiring gaps, the network has to configure the measurement gaps. Two periodic measurement gap patterns both with a measurement gap length of 6 ms are defined for LTE:
  Measurement gap pattern #0 with repetition period 40 ms
  Measurement gap pattern #1 with repetition period 80 ms
  The measurements performed by the UE are then reported to the network, which may use them for various tasks.
  The following measurements are specified or can be performed by LTE UE which are done in measurement gaps:
  Inter-frequency cell detection or cell identification
  Inter-frequency Reference Signal Received Power (RSRP) measurement
  Inter-frequency Reference Signal Received Quality (RSRQ) measurement
    Inter-frequency reference signal time difference (RSTD)
  Inter-RAT cell identification; example of RATs are Global System for Mobile communication (GSM)/ GSM Enhanced Data rates for GSM Evolution (EDGE) Radio Access Network (GERAN), WCDMA, Universal Terrestrial Radio Access (UTRA) Time Division Duplex (TDD), CDMA2000 etc.
  Inter-RAT measurements e.g. Common Pilot Channel (CPICH) (Received Signal Code Power) RSCP, CPICH Ec/No, GSM carrier Received Signal Strength Indicator (RSSI) etc.

The measurement gaps are used in all duplex modes of operation e.g. Frequency Division Duplex (FDD), TDD and half-duplex (HD)-FDD (aka HD for simplicity). In half duplex (HD) or more specifically half duplex FDD (HD-FDD) the uplink and downlink transmissions take place on different paired carrier frequencies but not simultaneously in time in the same cell. This means the uplink and downlink transmissions take place in different time resources e.g. symbols, time slots, subframes or frames. In other words uplink and downlink subframes do not overlap in time. The number and location of subframes used for downlink (DL), uplink (UL) or unused subframes can vary on the basis of frame or multiple of frames.
Alignment of E-UTRA TDD Measurement Gaps with Particular Subframe Offsets
The frame structure used for E-UTRAN TDD is illustrated in FIG. 1. FIG. 1 shows frame structure type 2, used for TDD, with a 5 ms switching point. The uplink-downlink configurations used therewith are listed in Table 1 below.

TABLE 1

Uplink-downlink configurations.

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

It can be noted that for Uplink-downlink configuration 0, measurement gaps with offsets 3 and 8 subframes relative to the frame border will be squeezed in between two uplink subframes, see FIG. 2. Moreover it can be noted that for Uplink-downlink configurations 0, 1 and 6, measurement gaps with offsets 2 and 7 subframes will be squeezed in between a special subframe, consisting of a downlink part, a guard period and an uplink part, and an uplink subframe, see FIG. 3.
Timing for Measurement Gaps
One of the assumptions when defining existing UE behavior for measurement gaps was that the measurement gap was to be defined with respect to the downlink timing, i.e., it was to be aligned with DL subframes. Moreover, it was assumed that transmission that would be overlapping the measurement gap were to be dropped. The LTE specification Third Generation Partnership Project (3GPP) Technical Specification (TS) 36.133 V10.14.0 defines the following UE behavior:
  In the uplink subframe occurring immediately after the measurement gap,
    the Evolved-UTRA network (E-UTRAN) FDD UE shall not transmit any data the E-UTRAN TDD UE shall not transmit any data if the subframe occurring immediately before the measurement gap is a downlink subframe.

The second bullet covers LTE TDD but does not cover the case when the measurement gap is positioned between two uplink subframes, or between a special subframe and an uplink subframe. This might be justified if considering only the autonomous change of timing; and this since the UE only is allowed to autonomously change the transmit timing by at most 17.5×Ts (0.57 μs) per 200 ms provided that it is not the first transmission after Discontinuous Reception (DRX). The relative position of the gap would differ since it is defined from UL timing instead of DL timing, but the length would be 6 ms, as required.

In a practical implementation, at some point in time the UE has to plan for switching a radio receiver thereof from intra-frequency to inter-frequency, and later back again. Additionally, the UE may need to plan for when to carry out automatic gain control, need access to common reference signals, when to start recording IQ samples for offline processing, and/or configure hardware accelerators for online processing, and/or configure software for control and processing. Suppose that this planning is done say less than 200 ms in advance—then the autonomous change of timing would potentially result in that the gap would move at most ±0.6 μs in addition for measurement gaps that are positioned between uplink activities. This could be handled by removing 0.6 μs from the beginning and the end of the measurement gap, as a margin for change in position. The impact would be negligible.

Timing Advance

In order to preserve the orthogonality in the uplink (UL) the UL transmissions from multiple user equipments (UEs) in LTE need to be time aligned at a receiver, such as a base station, the eNode B or the like. This means the transmit timing of the UEs, which are under the control of the same eNode B, should be adjusted to ensure that their received signals arrive at the eNode B receiver at the same time or more specifically their received signals should arrive well within the cyclic prefix (CP). Normal CP length is about 4.7 μs. This ensures that the eNode B receiver is able to use the same resources, i.e. same Discrete Fourier Transform, DFT, or Fast Fourier Transform, FFT resource, to receive and process the signals from multiple UEs.

The UL timing advance (TA) is maintained by the eNode B through timing advance commands, aka timing alignment commands, sent to the UE based on measurements on UL transmissions from that UE. For example the eNode B measures two way propagation delay or round trip time for each UE to determine the value of the TA required for that UE.

For a timing advance command received on subframe n, the corresponding adjustment of the uplink transmission timing shall by applied by the UE from the beginning of subframe n+6.

The timing advance command indicates the change of the uplink timing relative to the current uplink timing of the UE transmission as multiples of 16 Ts, where Ts=32.5 ns and is called basic time unit in LTE.

In case of random access response, an 11-bit timing advance command, TA, for a Timing Advance Group (TAG) indicates NTA values by index values of TA=0, 1, 2, . . . , 1282, where an amount of the time alignment for the TAG is given by NTA=TA×16. NTA is defined above in section "Alignment of E-UTRA TDD measurement gaps with particular subframe offsets".

In other cases, a 6-bit timing advance command, TA, for a TAG indicates adjustment of the current NTA value, NTA,old, to the new NTA value, NTA,new, by index values of TA=0, 1, 2, . . . , 63, where NTA,new=NTA,old+(TA−31)×16. Here, adjustment of NTA value by a positive or a negative amount indicates advancing or delaying the uplink transmission timing for the TAG by a given amount respectively.

Timing advance updates are signaled by the evolved Node B (eNB) to the UE in MAC PDUs.

The discussion about timing for the measurement gaps is now resumed. When taking timing advance (TA) commands into account, it becomes somewhat more problematic. Change of timing has no impact on the measurement gaps that are covered by the text above since their positions are determined by the DL timing, but may have a big impact on the gaps whose positions are determined by the UL timing, i.e. those listed in the previous subsection. Although not very likely, the UE can receive one TA command every DL or special subframe to be applied 4 subframes later. Each such TA command may change the UL timing within the range −31×16 Ts to 32×16 Ts (about ±17 μs). If say assuming that the aforementioned planning is done 20 ms in advance, it would mean that the maximum timing change would be about ±180 μs for Uplink-downlink configuration 1. How much of this that actually can be applied depends on special subframe configuration, e.g. size of guard period, and aggregated timing advance at the time when the planning is carried out, e.g. when the 20 ms period begins since the aggregated timing advance is bounded. If handling the uncertainty in position of the measurement gap due to potential change of UL timing using the same approach as for the autonomous change of timing, the measurement gap will have to be reduced by, in worst case, about 0.36 ms. This is because the UE has to plan for the maximum of the aggregated TA change in either direction 20 ms in advance. This would leave too little time for the gap to be useful for cell search and measurements.

Considering the above analysis the minimum guaranteed measurement gap is analyzed for the following scenarios:

(a) FDD single component carrier, Rel.8 and onwards
(b) TDD single component carrier, Rel.8 and onwards
(c) FDD Carrier Aggregation (CA), Rel.10 and onwards
(d) TDD CA with same UL/DL allocation on both carriers, Rel.10 and onwards for single TAG, and Rel.11 and onwards for multiple TAGs. Gap is positioned between UL subframes.
(e) TDD CA with different UL/DL allocation on the carriers, Rel.11 and onwards. But there are no performance requirements in Rel-11. Gap on one carrier is positioned between UL subframes.

Illustrations are provided in FIG. 4 and minimum guaranteed measurement gap length as well as mitigation to achieve at least 6 ms is provided in Table 2 below. FIG. 4 thus illustrates scenarios for which resulting measurement gap length is analyzed. Timing advance commands received during the 6 subframes before the gap will modify the length of the gap. Striped subframes are those where no serving cell transmission or reception is to be carried out under rules according to prior art.

TABLE 2

Analysis of minimum guaranteed measurement gap both with
and without received TA commands before the gap, and
mitigation to guarantee a minimum gap length of 6 ms.

| Scenario | Description | Minimum gap when no TA commands are received immediately before the gap | Minimum gap when TA immediately before, to be applied during gap | Mitigation to guarantee minimum 6 ms gap |
|---|---|---|---|---|
| (a) | Single carrier FDD cell | 6 ms | 6 ms (No impact since first UL after gap is dropped) | Nothing needed |
| (b) | Single carrier TDD cell, UL/DL configuration 0 | 6 ms | 6-4 × 0.0167 = 5.93 ms (4 TA commands may have to be applied during gap) | Drop UL after gap |
| (c) | CA of FDD cells; single TAG | 6 − 0.030 = 5.97 ms (UE shall handle DL timing offset of up to 30.26 us between PCell and SCell(s)) | 5.97 ms (No impact since first UL after gap is dropped) | Drop DL after gap |
| (d) | DL & UL CA of TDD cells with same configuration, UL/DL configuration 0 | 6 − 0.032 = 5.97 ms (TA difference between multiple TAGs shall be at most 32.47 us) | 5.97-4 × 0.0167 = 5.90 ms (4 TA commands may have to be applied during gap, and hence shorten it) | Drop UL after gap |
| (e) | DL & UL CA of TDD cells with different configuration, UL/DL configurations 0 and 5, respectively | 6 − 0.032 = 5.97 ms (TA difference between TAGs shall be at most 32.47 us) | 5.97-4 × 0.0167 = 5.90 ms (4 TA commands may have to be applied during gap, and hence shorten it) | Drop UL after gap |

In some scenarios such as in large cell size and also when UL CA is used the UE will have to shorten the measurement gap e.g. from 6 ms to 5.90 ms. This is needed to ensure that the UE is able to communicate with the serving cell in the subframe after the gap. This shortening of the gap will however degrade the mobility performance, since UE after taking into account the frequency switching from serving to non-serving carrier and vice versa—total is 1 ms—is left with less than 5 ms, i.e. 5.90 ms reduced by 1 ms, for actual measurement. At least 5 ms is needed to ensure cell search which requires Primary Synchronization Signal/Secondary Synchronization Signal (PSS/SSS) in LTE and which are sent every 5 ms. A problem is hence that the time left for measurement is too short.

In some scenarios such as when no UL CA is used and when UE is close to the base station, then the network node may not have to send large TA commands to the UE. In this case the UE may not have to shorten the measurement gap and can operate with serving cell in the subframe after the gap. A problem is hence if the time left for measurement is increased due to the previous problem, the measurement time is unnecessarily long in this case.

Similarly in some scenario, where UE needs to be served with high data rate, then it is beneficial that UE operates, e.g. sends or receives data to/from its serving cell, in subframe immediately after the gap.

SUMMARY

An object may be to alleviate or at least reduce the above mentioned problem(s). In particular, an object may be to find a flexible and efficient solution for handling operational behavior of a UE in connection with measurement gaps.

According to a first aspect, the object is achieved by a method, performed by a network node, for managing an operational behavior of a wireless device. The network node determines the operational behavior of the wireless device in at least one subframe occurring immediately after a measurement gap used by the wireless device for performing radio measurements, wherein the determined operational behavior is based on one or more criteria relating to a scenario in which the wireless device operates. The network node configures the wireless device according to the determined operational behavior. Hence, there is provided a method, performed by a network node, e.g. a radio network node, for managing of operational behavior.

According to a second aspect, the object is achieved by a network node configured to manage an operational behavior of a wireless device. The network node is configured to determine the operational behavior of the wireless device in at least one subframe occurring immediately after a measurement gap used by the wireless device for performing radio measurements, wherein the determined operational behavior is based on one or more criteria relating to a scenario in which the wireless device operates. Furthermore, the network node is configured to configure the wireless device according to the determined operational behavior. Hence, there is provided a network node configured to manage operational behavior of the wireless device.

According to a third aspect, the object is achieved by a method, performed by a wireless device, for managing a measurement gap used by the wireless device for performing radio measurements, wherein the wireless device is served by a network node. The wireless device receives, from the network node, a configuration of an operational behavior of the wireless device in at least one subframe occurring immediately after the measurement gap. The wireless device applies the configuration in the at least one subframe. Hence, there is provided a method, performed by a wireless device (or UE), for obtaining operational behavior.

According to a fourth aspect, the object is achieved by a wireless device configured to manage a measurement gap used by the wireless device for performing radio measurements, wherein the wireless device is configured to be served by a network node. The wireless device is configured to receive, from the network node, a configuration of an operational behavior of the wireless device in at least one subframe occurring immediately after the measurement gap. Moreover, the wireless device is configured to apply the configuration in the at least one subframe. Hence, there is provided a wireless device configured to obtain operational behavior.

According to further aspects, the object is achieved by computer programs and computer program products corresponding to the aspects above.

As provided by at least some embodiments herein, the network node configures the wireless device with the operational behavior of the wireless device, also referred to as "UE operational behavior", regarding whether or not the wireless device shall transmit and/or receive signals in at least one serving cell in a subframe which occurs immediately after the measurement gap. The gaps are used for measurements on non-serving carriers, e.g. non-serving cells. The network node decides the UE operational behavior based on one or more criteria or scenario in which the wireless device operates. Hence, a network controlled UE behavior after measurement gap is achieved.

The UE operational behavior (behavior of the UE) regarding whether the wireless device is allowed to skip the transmission and/or reception of signals in one or more subframes after the measurement gap may be controlled by the network node via explicit signaling. It shall here be noted that the terms "UE behavior", "UE operational behavior", "operational behavior" are intended to be examples terms that can be used to describe how the wireless device acts in a subframe directly subsequent to a measurement gap. This behavior may also be referred to as a mode of operation, mode of transmission or the like. As an example, the behavior may be that the wireless device is allowed to transmit or receive a transmission in the subframe, e.g. being directly subsequent to the measurement gap, or that the wireless device shall transmit or receive a transmission in the subframe (being directly subsequent to the measurement gap). A transmission refers to a portion of data, e.g. control or user data, that corresponds to one subframe, e.g. can be carried in one subframe.

The actions performed by a wireless device served by a network node may comprise one or more of the following actions (steps):

Receiving a message from the network node indicating how the UE should operate with respect to at least one serving cell in a subframe occurring immediately after the measurement gap; and Operating with respect to at least one serving cell based on the received message.

The actions performed in a network node serving a wireless device may comprise one or more of the following actions:

Determining based on one or more criteria whether or not the UE may have to shorten a measurement gap length in time below a certain threshold in order for the wireless device to be able to communicate with at least one serving cell in a subframe occurring immediately after the measurement gap; and Configuring the UE based on the determination, how to operate in the subframe occurring immediately after the measurement gap. E.g. sending (to the wireless device) a message indicating how the UE should operate with respect to at least one serving cell in a subframe occurring immediately after the measurement gap (directly subsequent to the measurement gap).

In these manners, the UE behavior is controlled and managed, e.g. in a dynamic manner as opposed to in prior art in which the wireless device has a specific operational behavior of transmission and/or reception in subframe after measurement gap, by the network node based on the scenario and criteria.

An advantage with some embodiments may hence be that the UE behavior may be controlled, or adapted to, based on network deployment scenarios.

Another advantage with some embodiments may be that the network node is able to use radio resources more efficiently.

A further advantage with some embodiments may be that the wireless device is still able to transmit and/or receive in subframe after the measurement gap.

BRIEF DESCRIPTION OF THE DRAWINGS

The various aspects of embodiments disclosed herein, including particular features and advantages thereof, will be readily understood from the following detailed description and the drawings, in which.

DETAILED DESCRIPTION

Figure 1:
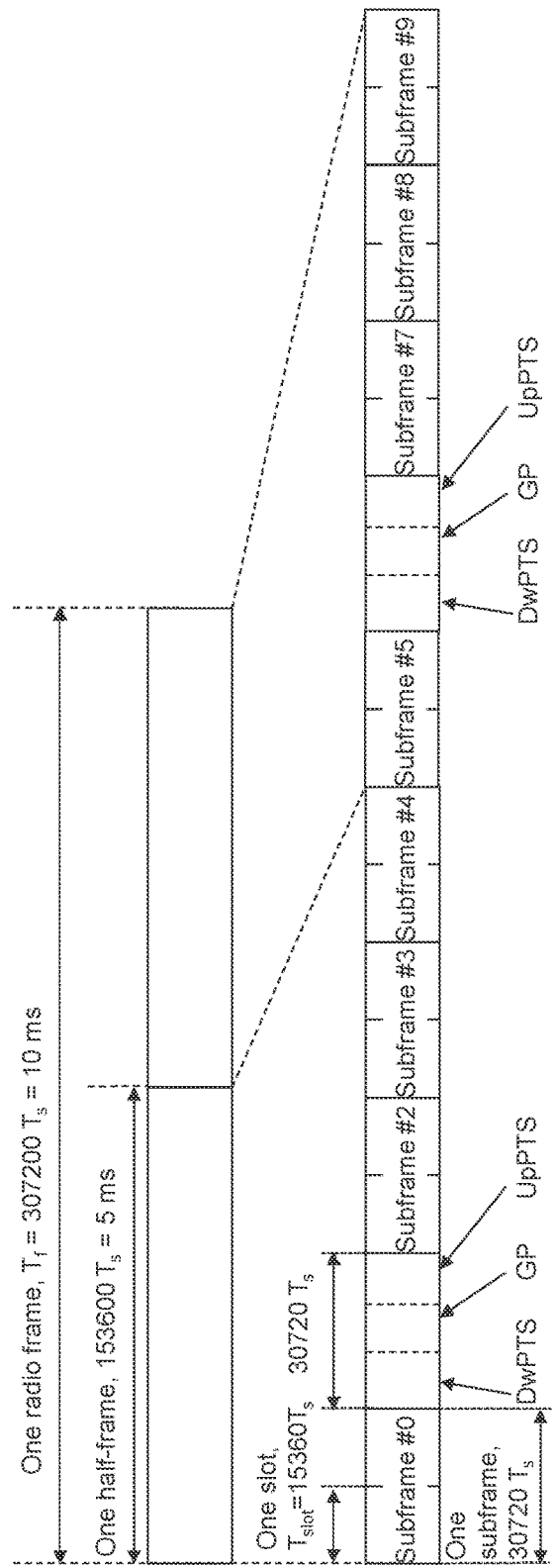
FIG. 1 is an illustration of frame structure type 2 used for TDD.
Figure 2:
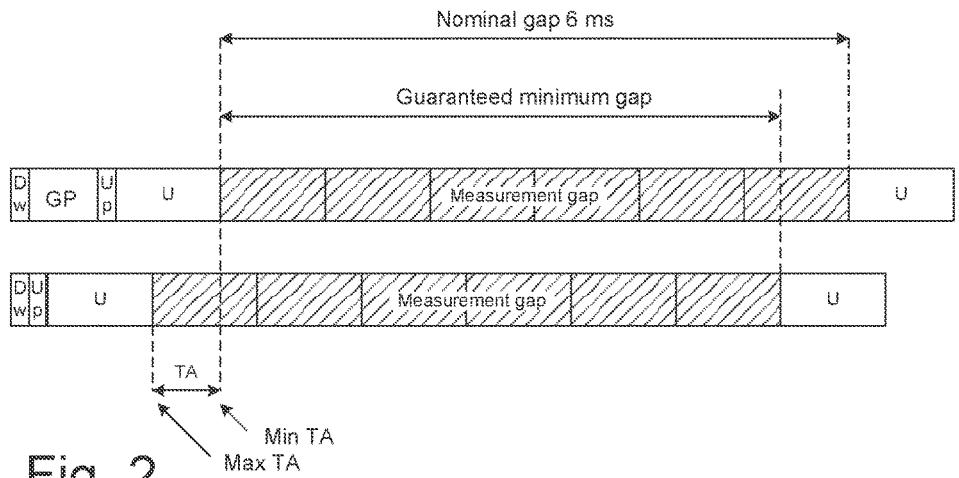
FIG. 2 is an illustration of Uplink-downlink configuration 0 and alignment of measurement gap with offset 3 or 8 subframes.
Figure 3:
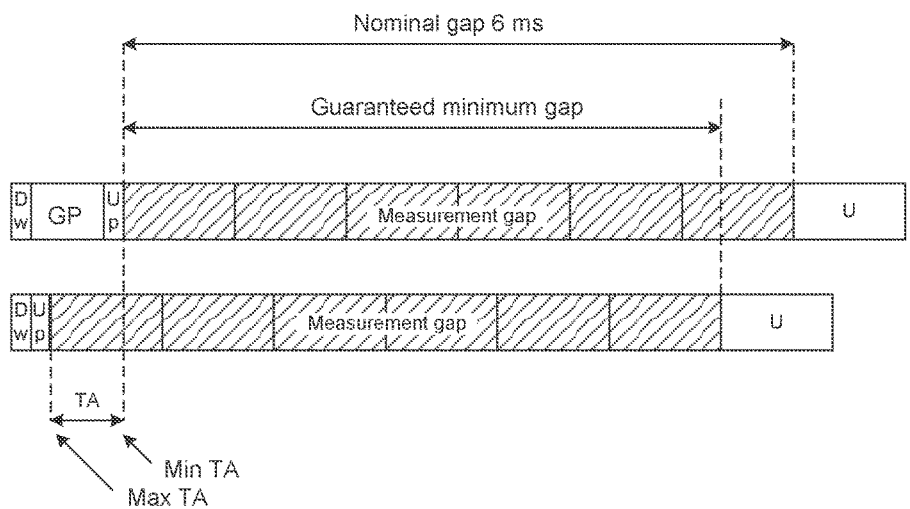
FIG. 3 is another illustration of Uplink-downlink configurations 0, 1 and 6 and alignment of measurement gap with offset 2 or 7 subframes.
Figure 4:
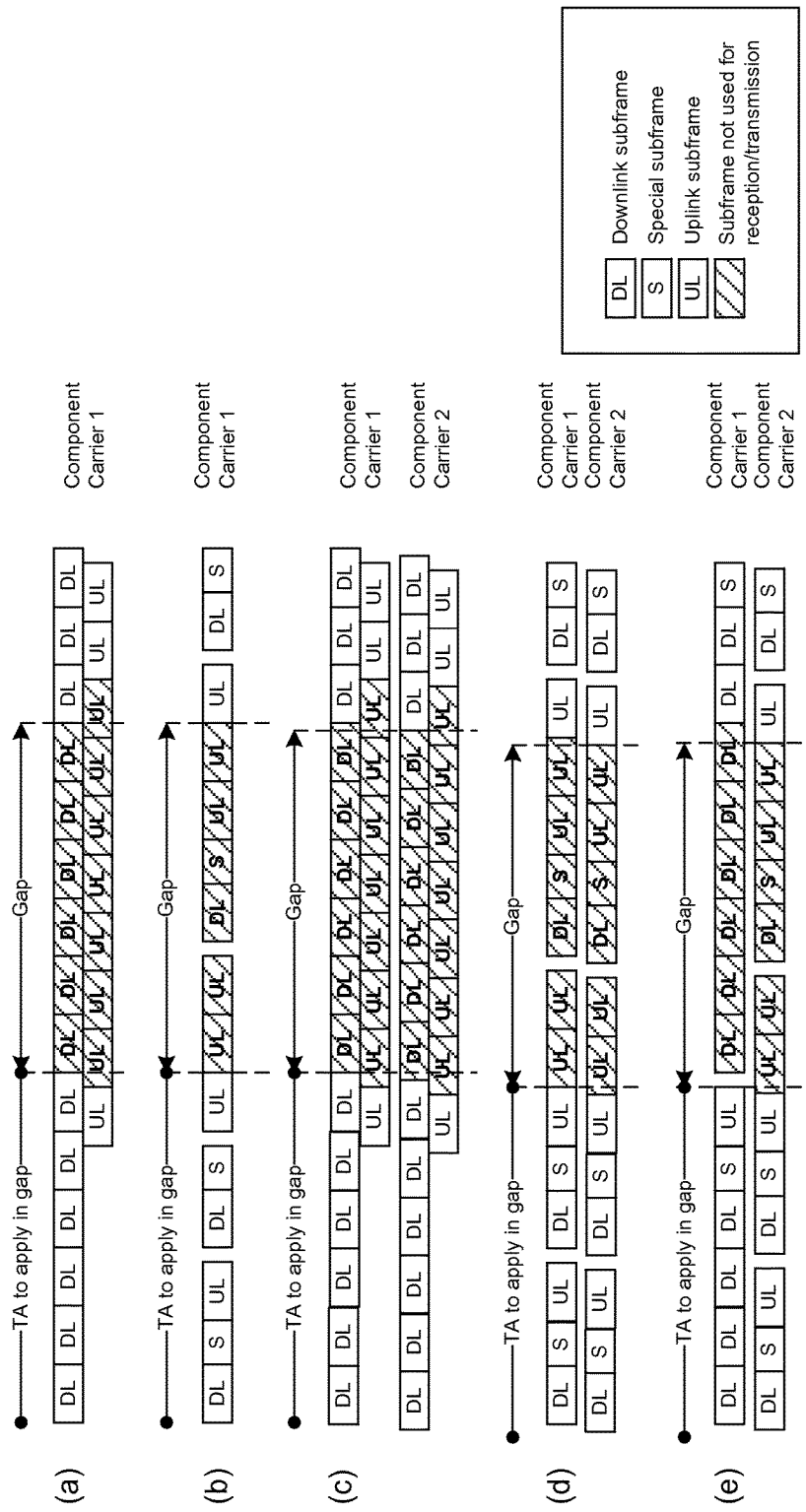
FIG. 4 is a sketch of scenarios relating to embodiments herein.

Throughout the following description similar reference numerals have been used to denote similar features, such as actions, steps, nodes, elements, units, modules, circuits, parts, items or the like, when applicable. In the Figures, features that appear in some embodiments are indicated by dashed lines.

Figure 5:
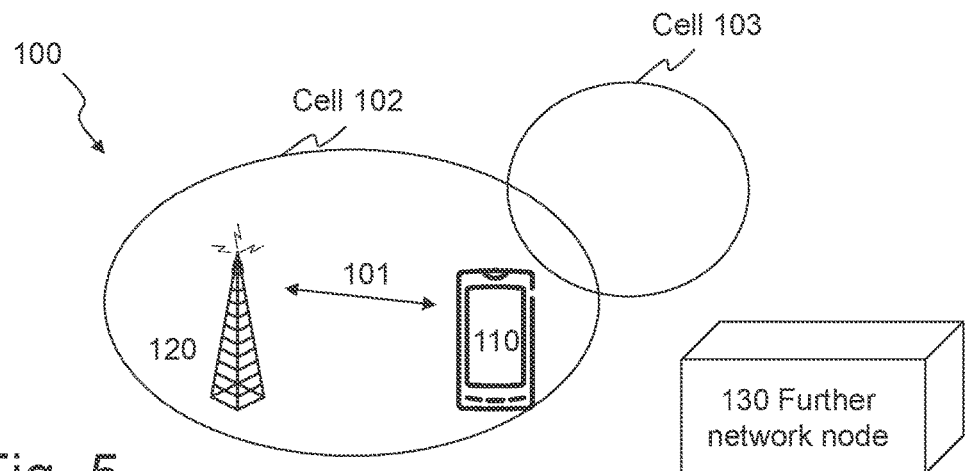
FIG. 5 is a schematic overview of an exemplifying wireless network in which embodiments herein may be implemented.

FIG. 5 depicts an exemplifying wireless network 100 in which embodiments herein may be implemented. In this example, the wireless network 100 is a Long Term Evolution (LTE) network. In other examples, the wireless network 100 may be any Third generation partnership project (3GPP) network.

The wireless network 100 may comprise a wireless device 110 and a network node 120. The wireless device 110 may communicate 101 wirelessly, e.g. via a radio interface, with the network node 120.

The network node 120 may operate a cell 102, which may be a serving cell with respect to the wireless device 110. Hence, the wireless device 110 may be served by the cell 102. This means e.g. that the wireless device 110 is connected to the cell 102. The cell 102 may be referred to as a first cell 102.

Moreover, the wireless network 100 may comprise a further cell 103, which may be referred to as a second cell 103. The wireless device 110 may perform measurements at the further cell 103 in measurement gaps as described in the background section. The further cell 103 may be a non-serving cell with respect to the wireless device 110. As used herein, the term "wireless device" may refer to a user equipment, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, an embedded processor equipped with radio communication capabilities or connected to a modem, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc. The term "user", or "subscriber" may refer to the wireless device. In some embodiments non-limiting term UE is used. The UE herein can be any type of wireless device capable of communicating with network node or another UE over radio signals. The UE may also be radio communication device, target device, device-to-device (D2D) UE, Machine-Type Communication (MTC) UE or UE capable of machine-to-machine communication (M2M), a sensor equipped with UE, iPad, Tablet, mobile terminals, smart phone, laptop embedded equipped (LEE), laptop mounted equipment (LME), USB dongles, Customer Premises Equipment (CPE) etc.

Furthermore, the wireless network 100 may comprise a further network node 130. The further network node 130 may be a core network node e.g. Mobility Management Entity (MME) or the like.

As used herein, the term "network node" may refer to a radio base station, an evolved Node B, an eNB, a Node B, a radio network controller, a Remote Radio Unit (RRU), a base station, a relay, a repeater or the like.

Also in some embodiments generic terminology, "radio network node" or simply "network node (NW node)", is used. It can be any kind of network node which may comprise of Base Station (BS), radio base station, base transceiver station, base station controller, network controller, evolved Node B (eNB), Node B, relay node, access point, radio access point, Radio Network Controller (RNC), Base station Controller (BSC), Remote Radio Unit (RRU) Remote Radio Head (RRH) etc.

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the Primary Component Carrier (PCC) or simply primary carrier or even anchor carrier. The remaining ones are called secondary component carrier (SCC), secondary carriers or supplementary carriers. The serving cell is interchangeably called primary cell (PCell) or primary serving cell (PSC). Similarly the secondary serving cell is interchangeably called secondary cell (SCell) or secondary serving cell (SSC).

The embodiments are described for LTE. However the embodiments are applicable to any RAT or multi-RAT systems, where the UE receives and/or transmit signals (e.g. data) e.g. LTE FDD/TDD, WCDMA/High Speed Packet Access (HSPA), GSM/GERAN, Wireless Fidelity (WiFi), Wireless Local Area Network (WLAN), Code Division Multiple Access (CDMA)-2000 etc.

Figure 6:
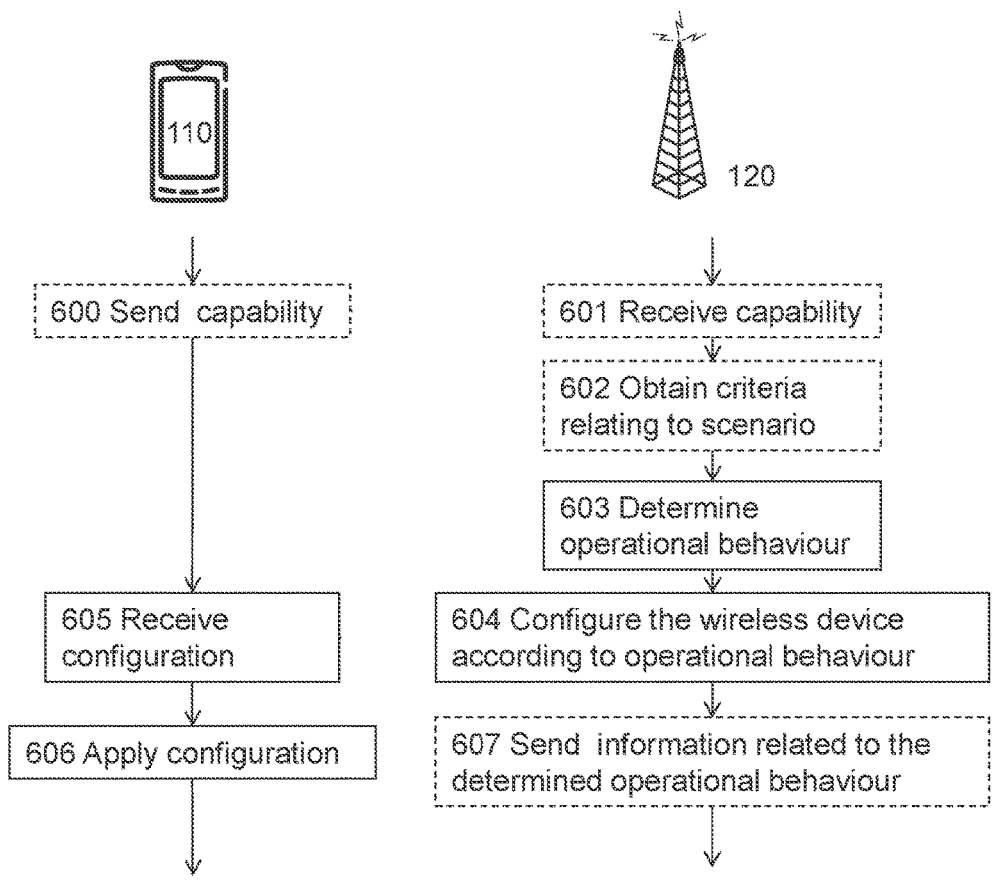
FIG. 6 is a schematic, combined signaling scheme and flowchart illustrating embodiments of the methods when performed in the wireless network according to FIG. 5.

At least the following embodiments are disclosed:
Description of a scenario involving network controlled UE operational behavior for UE operation after measurement gap
Method in a network node of determining and configuring UE with UE operational behavior for operation after measurement gap
Method in a UE of obtaining, e.g. receiving and applying, UE operational behavior for UE operation after measurement gap
Method in a UE signaling capability related to receiving and applying UE operational behavior for UE operation after measurement gap FIG. 6 illustrates an exemplifying method according to embodiments herein when performed in connection with the wireless network 100 of FIG. 5. Accordingly, the network node 120 performs a method for managing an operational behavior of a wireless device 110 and the wireless device 110 performs a method for managing a measurement gap used by the wireless device 110 for performing radio measurements. As mentioned, the wireless device 110 is served by the network node 120.

The operational behavior, which is further elaborated in section "Description of a scenario involving network controlled UE operational behavior for UE operation after measurement gap" below, may comprise one of:
a first transmission behavior after the measurement gap, wherein the transmission behavior relates to that the wireless device 110 is allowed to transmit;
a second transmission behavior after the measurement gap, wherein the transmission behavior relates to that the wireless device 110 is forbidden to transmit;
a first reception behavior after the measurement gap, wherein the reception behavior relates to that the wireless device 110 is allowed to receive; and a second reception behavior after the measurement gap, wherein the reception behavior relates to that the wireless device 110 is forbidden to receive.

The following actions may be performed in any suitable order

Action 600

In order to inform the network node 120 about the capabilities of the wireless device 110, this action may be performed. Hence, the wireless device 110 may send, to the network node 120, an indication about the wireless device's 110 capability relating to the operational behavior, e.g. in the form of a so called UE capability. The indication may indicate whether or not the wireless device is capable of being configured according to the configuration of the operational behavior. For example, if the network node 120 is informed, in this action, that the wireless device 110 is not capable of handling, and acting, according to the operational behavior, the network node 120 does not need to perform action 603 and 604 since these actions would have no effect.

Action 601

Following action 600, the network node 120 may receive, from the wireless device 110, the indication about the wireless device's capability relating to the operational behavior.

Action 602

The network node 120 may obtain one or more criteria relating to a scenario in which the wireless device 110 operates. The criteria may be received from other nodes e.g. from the further network node 130, Operation and Maintenance (O&M), Operating Support System (OSS), core network node, neighboring network node. The criteria may also be stored in the network node 120 e.g. when the network node 120 is installed into the wireless network 100.

Said one or more criteria include one or more of:
a deployment scenario characterized by cell type and/or cell size of the wireless network 100;
a type of multi-carrier operation;
a frequency of usage of large timing alignment commands;
a number of carriers to measure in the measurement gap;
a frequency of usage of the measurement gap;
a signal quality of target cells;
a data rate requirement;
historical information relating to operational behavior; and the like.

These one or more criteria are further described in section "Determination of the operational behavior of the wireless device".

Action 603

The network node 120 determines the operational behavior of the wireless device 110 in at least one subframe occurring immediately after a measurement gap used by the wireless device 110 for performing radio measurements.

The determined operational behavior is based on one or more criteria relating to a scenario in which the wireless device 110 operates. Further details are provided in section "Determination of the operational behavior of the wireless device".

In some embodiments, the network node 120 may determine the operational behavior by receiving an indication relating to these one or more criteria from the further network node 130. Then, the network node 120 may determine the operational behavior based on the indication.

In some scenarios, the network node 120 may serve the wireless device 110 on a multi-carrier including a first serving cell and a second serving cell, wherein the determined operational behavior may apply in the first serving cell. Expressed differently, the wireless device 110 is operated in a multi-carrier scenario. The network node 120 may then determine a further operational behavior of the wireless device 110 in at least one subframe occurring immediately after a further measurement gap used by the wireless device 110 for performing radio measurements at the second serving cell. Similarly to the operational behavior, the further operational behavior may apply in the second serving cell.

Since the operational behavior depends on the measurement gaps, this action may be expressed somewhat differently by stating that the network node 120 may determine the measurement gap. See also section "Method in a network node of determining and configuring UE with UE operational behavior for operation after measurement gap" below. As an example, this means that a length of the measurement gap is determined, i.e. the measurement gap may last for a certain number of milliseconds, e.g. 6 ms in case of so called normal measurement gap. However, as described herein, it may be required to use a shorter measurement gap in some cases.

Action 604

The network node 120 configures the wireless device 110 according to the determined operational behavior.

In some embodiments, this means that the network node 120 sends a message to the wireless device 110. The message may then include a configuration. The message is generated based on the measurement gap, which may have been determined in action 603. By sending the message to the wireless device 110, the network node 120 makes it possible for the wireless device 110 to be configured according to the message when received by the wireless device 110 in action 604.

The message may indicate, to the wireless device 110, an operational behavior relating to required transmission or reception or relating to possible transmission or reception. The transmission and reception relates to a subframe following directly subsequent after the measurement gap, i.e. a subframe that occurs immediately after the measurement gap.

Action 605

When action 604 has been performed, the wireless device 110 receives, from the network node 120, a configuration of an operational behavior of the wireless device 110 in at least one subframe occurring immediately after the measurement gap.

The configuration may indicate that the operational behavior may comprise one of:
a first transmission behavior after the measurement gap, wherein the transmission behavior relates to that the wireless device 110 is allowed to transmit;
a second transmission behavior after the measurement gap, wherein the transmission behavior relates to that the wireless device 110 is forbidden to transmit;
a first reception behavior after the measurement gap, wherein the reception behavior relates to that the wireless device 110 is allowed to receive; and
a second reception behavior after the measurement gap, wherein the reception behavior relates to that the wireless device 110 is forbidden to receive.

In those embodiments, where the configuration is included in the message, the wireless device 110 receives the message. By receiving the message, the wireless device 110 is configured according to the message. Hence, the network node has in this manner configured the wireless device 110.

Action 606

Following action 605, the wireless device 110 applies the configuration in the at least one subframe. When the configuration is included in the message as mentioned above, the wireless device 110 may be said to operate according to the message.

Action 607

The network node 120 may send, to another network node (not shown), information related to the determined operational behavior of the wireless device 110. Examples of the other network node are neighboring network node, Self-Organizing Network (SON) node, O&M etc. The other network node, such as the neighboring network node, may use this information for determining the operational behavior of the wireless device 110 after a handover. The other network node, such as SON or O&M, may use the received information to collect statistics and use this for tuning system parameters, e.g. TDD UL/DL subframe configuration, used in the network nodes.

The various embodiments as indicated above are further elaborated below. In the following the wireless device 110 is referred to as UE.

Description of a Scenario Involving Network Controlled UE Operational Behavior for UE Operation after Measurement Gap The scenario comprises of at least one UE served by at least one cell (aka serving cell or PCell of the UE) managed, controlled or served by a network node. The serving cell operates on a carrier frequency (f1). The UE capable of multi-carrier (aka carrier aggregation) may also be served by a plurality of serving cells operating on PCC and SCC(s) e.g. primary cell (PCell) on PCC and one or more secondary cells (SCells) on one or more SCCs. The PCell and SCell(s) may be managed, controlled or served by the same network node or by different network nodes. The embodiments, though described for one serving cell, are applicable to the UE served by any number serving cells. In case of multiple serving cells the UE and/or network node serving the UE may apply the procedures disclosed herein independently for each serving cell or jointly (i.e. same configuration) for two or more serving cells or any group of serving cells. The group of serving cells may belong to the same TA group (TAG) or they may belong to different TAGs (e.g. one serving cell in primary TAG (pTAG) and another one in secondary TAG (sTAG)).

The UE can be operating in any of the duplex mode e.g. FDD, HD-FDD or TDD. The UE may also be configured to operate in any combination of duplex modes; for example UE may be configured with PCC and SCC using FDD and TDD respectively.

The UE can be configured by the network node with measurement gaps for performing one or more inter-frequency and/or inter-RAT measurements on cells belonging to one or more carrier frequencies. Based on the received configuration the measurement gaps are created by the UE on at least one serving cell; but gaps may also be created on all serving cells. During each measurement gap the UE cannot transmit to and/or receive signals from the serving cell.

The network node may decide and configure the UE (as elaborated in section "Method in a network node of determining and configuring UE with UE operational behavior for operation after measurement gap") with one of the UE operational behaviors with which the UE should operate in one or more subframes occurring after each measurement gap. The terms UE operational behavior, UE operational configuration, UE signal operational behavior or UE signal configuration after the measurement gap (or more specifically in subframe after the gap) are interchangeably used but they have the same meaning. More specifically the UE operational behavior may comprise of four different UE behaviors as explained below:

First UE transmission behavior after the measurement gap, referred to as "first transmission behavior" above: In this case UE may transmit signals to at least one serving cell in at least one subframe occurring immediately after the measurement gap. The UE may transmit for example if scheduled by the network node, for performing random access, for transmitting periodic signals such as Sounding Reference Signal (SRS) etc. The term that 'UE may transmit' herein means that the UE is allowed to transmit signals.

Second UE transmission behavior after the measurement gap, referred to as "second transmission behavior" above: In this case UE shall NOT transmit any signal to at least one serving cell in at least one subframe occurring immediately after the measurement gap. As a special case the UE shall NOT transmit signals in any of the serving cells e.g. no transmission in any of the PCell and configured SCell(s). The term that the 'UE shall NOT transmit' herein means that the UE is forbidden to transmit any signal.

First UE reception behavior after the measurement gap, referred to as "first reception behavior" above: In this case the UE may receive signals from at least one serving cell in at least one subframe occurring immediately after the measurement gap. The UE may receive signals for example if scheduled by the network node, for performing a radio measurements such as RSRP, RSRQ etc. The term that 'UE may receive' herein means that the UE is allowed to receive signals.

Second UE reception behavior after the measurement gap, referred to as "second reception behavior" above: In this case UE shall NOT receive any signal to at least one serving cell in at least one subframe occurring immediately after the measurement gap. As a special case the UE shall NOT receive signals in any of the serving cells e.g. no reception of signals in any of the PCell and configured SCell(s). The term that the 'UE shall NOT receive' herein means that the UE is forbidden to receive any signal.

Any of the above UE behavior may also depend upon type of the subframe occurring immediately before the measurement gap. The type of subframe can be any of UL subframe, DL subframe, special subframe in TDD or unused subframes in case of HD operation.

Method in a Network Node of Determining and Configuring UE with UE Operational Behavior for Operation after Measurement Gap This embodiment comprises a method in a network node. The method may comprise the following actions, such as steps:

In the first step the network node determines the most appropriate UE operational behavior for the UE to operate in one or more subframe immediately after the measurement gap. In the second step the network node transmits the information related to the determined UE operational behavior to the UE. These steps are elaborated below.

Determination of UE Operational Behavior

In this step the serving network node of the UE either itself determines the most appropriate UE operational behavior or determines it based on indication or recommendation received from another network node (e.g. neighboring network node, O&M, OSS, SON etc).

The serving network node or other network node may use one or more of the following criteria to determine the UE operational behavior.

Network deployment scenario: This may be characterized by cell type and/or cell size (e.g. cell radius or cell range). Examples of cell types are macro cells, pico cells, micro cells, femto cells etc. In micro or pico cell and/or in small cell size (e.g. cell range of up to 500 m) the network node may typically send smaller TA commands (e.g. 500 ns) to the UE. In this case the network node may select the first UE transmission behavior after the measurement gap and/or first UE reception behavior after the measurement gap.

Type of multi-carrier operation: The network may select the second UE transmission behavior after the measurement gap and/or second UE reception behavior after the measurement gap if UE is configured with UL CA or with UL CA with at least 2 CCs in different bands. This is because in this case the independent TA for different TAGs will create large difference (e.g. 33 us) between UE transmission timing from different CCs.

Frequency of usage of large TA commands: If network node sends or is expected to send several consecutive (e.g. 4 or more) large TA commands (e.g. +15 us or more) to the UE, then the network may select the second UE transmission behavior after the measurement gap and/or second UE reception behavior after the measurement gap.

Number of carriers to measure in gaps: In case UE is configured or is expected to be configured to measure several carriers (e.g. 5 or more) and especially if they belong to two or more different RATs (e.g. GSM, UTRA) then the network may select an option that would not require the UE to shorten the measurement gap. For example the network may select the second UE transmission behavior after the measurement gap and/or second UE reception behavior after the measurement gap.

Frequency of usage of gaps: If measurement gaps are used very frequently then the network node may select the UE behavior such that usage of subframe for serving cell operation is maximized. In this case the network node may select the first UE transmission behavior after the measurement gap and/or first UE reception behavior after the measurement gap.

Signal quality of target cells: If expected signal quality or that based on previous results or based on historical data reveal that the quality of the cells to be measured in measurement gaps is below a threshold, then the network node may select an option that would not require the UE to shorten the measurement gap. For example the network may select the second UE transmission behavior after the measurement gap and/or second UE reception behavior after the measurement gap. Examples of signal quality are Reference Signal Received Quality (RSRQ), Reference Signal Received Power (RSRP), Signal-to-Noise Ratio (SNR), Signal-to-Interference-and-Noise Ratio (SINR), Bit-Error-Rate (BER), Block-Error-Rate (BLER), Frame-Error-Rate (FER) etc.

Data rate requirements: If the data rate requirement for the UE is higher than a threshold then the network node may select an option such that the UE can be served in as many subframes. In this case the network node may select the first UE transmission behavior after the measurement gap and/or first UE reception behavior after the measurement gap.

Historical information: The network node may also take into account the historical information (e.g. stored in the memory) to decide which option is to be used. For example if certain option has been used repeatedly (e.g. more than 10 times) in certain scenario (e.g. small cell size, CA etc) then the network node may select the same option when UE operates in similar scenario.

Configuring UE with the Determined UE Operational Behavior

In this step the network node signals the information related to the selected UE operational behavior to the UE. For example the signaled information may comprise of the identifier(s) of one or more of the four pre-defined UE operational behaviors for enabling the desired UE operation in at least one subframe occurring immediately after the measurement gap. The same information (e.g. UE behavior to use) may be applicable to serving cell carrier or it may be applicable to all serving carriers or selected serving carriers in CA. The information may also be sent independently for each serving carrier out of the multiple serving carriers configured for CA. It may be pre-defined that the UE operational behavior is applicable to only N subframes that occurs after the gap; where N=1 as special case. The network node may also configure the UE with the value of N.

The network node may configure the UE with the above mentioned information (e.g. ID of pre-defined UE operational behavior(s)) before or after the UE is configured with the measurement gap. The signaled information may only apply until measurement gaps are used. If they are de-configured and configured again then the network node may have to send new information to the UE for the UE to apply for the renewed measurement gaps.

Signaling Information about the Selected UE Operational Behavior to Other Network Nodes In this step the network node signals the information related to the selected UE operational behavior to the other network node e.g. neighboring node such as to neighboring eNB over X2 interface in LTE. The neighboring network node (aka eNB2) may take into account or use this for the same UE after the cell change to eNB2 e.g. after handover.

The other network node may also store this information and use the statistics of UE operational behavior in one or more neighboring nodes for determining UE operational behavior for UEs under its own control.

Method in a UE of Receiving and Applying UE Operational Behavior for UE Operation after Measurement Gap In this embodiment the UE receives the information related to the UE operational behavior from the network node as described in the previous section e.g. from serving cell via Radio Resource Control (RRC) signaling.

The UE may typically receive the IDs of the selected UE operational behavior out of the four pre-defined UE operational behaviors. For example the UE may be configured by the network node to operate using the "second UE transmission behavior after the measurement gap". In this case UE is not allowed to transmit any signal in the subframe occurring immediately after the measurement gap.

The UE upon receiving the information (e.g. ID of pre-defined UE behavior) from the network node determines the UE operational behavior to be used after the gap based on pre-defined rule i.e. comparing the received ID with ID of the pre-defined behaviors. The UE will then determine if it is configured with measurement gap or not e.g. based on received configuration related to the measurement gaps and/or by checking if inter-frequency/inter-RAT measurements are ongoing in gaps. If the UE is using gaps then the UE shall adapts its operational behavior according to the received information from the network node. For example if UE is not allowed to transmit then the UE shall not transmit any signal to the serving cell in the subframe immediately after the measurement gap. The UE shall apply this behavior in subframe after every gap until the UE is configured with a different UE behavior.

It may also be pre-defined that by default the UE has to apply certain UE operational behavior. However the network node can change the default UE behavior by configuring the UE with any other pre-defined UE operational behaviors. For example the default UE operational behavior can be (2nd transmission behavior) that the UE shall not transmit in subframe occurring immediately after the gap.

Method in a UE Signaling Capability Related to Receiving and Applying UE Operational Behavior for UE Operation after Measurement Gap According to this embodiment a UE signals a capability information to a network node such as base station, eNode B, relay, core network (MME) to inform it whether the UE is capable of receiving and using or applying information related to the UE operational behavior for UE operation after measurement gap. More specifically the UE capability information may indicate whether the UE is capable of receiving and using information for adapting its operational behavior with respect to signal transmission and/or reception in one or more serving cells i.e. whether UE is capable of any of the procedures disclosed in section "Description of a scenario involving network controlled UE operational behavior for UE operation after measurement gap" and section "Method in a UE of receiving and applying UE operational behavior for UE operation after measurement gap". The capability information is sent via higher layer signaling (e.g. RRC signaling) to the network node. The information may be sent during initial call setup or after cell change (e.g. handover etc) or during the session or call.

The UE capability information may also contain additional or more specific information such as:
  UE is capable of receiving and applying the received information for adapting UE operational behavior only on PCell or primary carrier or serving carrier;
  UE is capable of receiving and applying the received information for adapting the same UE operational behavior on PCell or primary carrier and one or more SCells or secondary carriers;
  UE is capable of receiving and applying the received information for adapting the same or different UE operational behavior on different serving cells e.g. different or same behaviors on PCell or primary carrier and one or more SCells or secondary carriers;
  The above capability applies only when same subframe configuration is used on all serving cells e.g. same TDD configuration or HD-FDD configuration is used.
  The frequency bands for which the UE is capable of performing any one or more of the above.

The acquired UE capability information may be used by the network node (e.g. eNode B, base station etc) for performing one or more radio operation tasks or network management tasks:
  The tasks comprise forwarding the received UE capability information to another network node which may use it after cell change of the UE.
  The network node may store the received capability information and use it in future e.g. when the same UE performs measurements using gaps.

Figure 7:
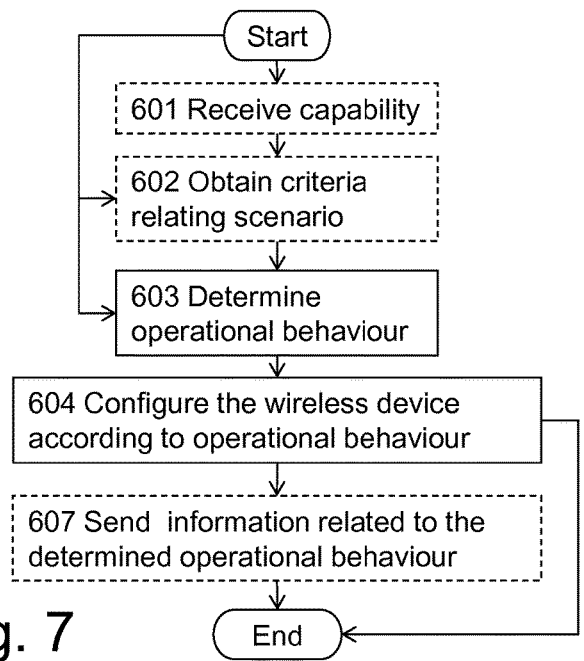
FIG. 7 is a flowchart illustrating embodiments of the method in the network node.

In FIG. 7, an exemplifying, schematic flowchart of the method in the network node 120 is shown. The network node 120 thus performs a method for managing an operational behavior of a wireless device 110. As mentioned, the same reference numerals have been reused to denote the same or similar action as in FIG. 6.

As mentioned, the wireless network 100 may comprise the wireless device 110 and the network node 120.

Again, the operational behavior may comprise one of:
  a first transmission behavior after the measurement gap, wherein the transmission behavior relates to that the wireless device 110 is allowed to transmit;
  a second transmission behavior after the measurement gap, wherein the transmission behavior relates to that the wireless device 110 is forbidden to transmit;
  a first reception behavior after the measurement gap, wherein the reception behavior relates to that the wireless device 110 is allowed to receive; and
  a second reception behavior after the measurement gap, wherein the reception behavior relates to that the wireless device 110 is forbidden to receive.

The following action may be performed in any suitable order.

Action 601

The network node 120 may receive, from the wireless device 110, an indication about the wireless device's capability relating to the operational behavior. The indication indicates whether or not the wireless device 110 is capable of being configured according to the determined operational behavior.

Action 603

The network node 120 determines 603 the operational behavior of the wireless device 110 in at least one subframe occurring immediately after a measurement gap used by the wireless device 110 for performing radio measurements, wherein the determined operational behavior is based on one or more criteria relating to a scenario in which the wireless device 110 operates.

The determining 603 of the operational behavior method may comprise receiving an indication relating to said one or more criteria from a further network node 130, wherein the determining 603 of the operational behavior is based on the indication.

As mentioned, said one or more criteria includes one or more of:
  a deployment scenario characterized by cell type and/or cell size of the
  wireless network 100;
  a type of multi-carrier operation;
  a frequency of usage of large timing alignment commands;
  a number of carriers to measure in the measurement gap;
  a frequency of usage of the measurement gap;
  a signal quality of target cells;
  a data rate requirement;
  historical information relating to operational behavior; and the like.

The network node 120 may serve the wireless device 110 on a multi-carrier including a first serving cell and a second serving cell, wherein the determined operational behavior may apply in the first serving cell, and wherein the determining 603 may comprise determining a further operational behavior of the wireless device 110 in at least one subframe occurring immediately after a further measurement gap used by the wireless device 110 for performing radio measurements at the second serving cell, wherein the further operational behavior may apply in the second serving cell.

Action 604

The network node 120 configures 604 the wireless device 110 according to the determined operational behavior.

Action 607

The network node 120 may send, to a further network node, information related to the determined operational behavior of the wireless device 110.

Figure 8:
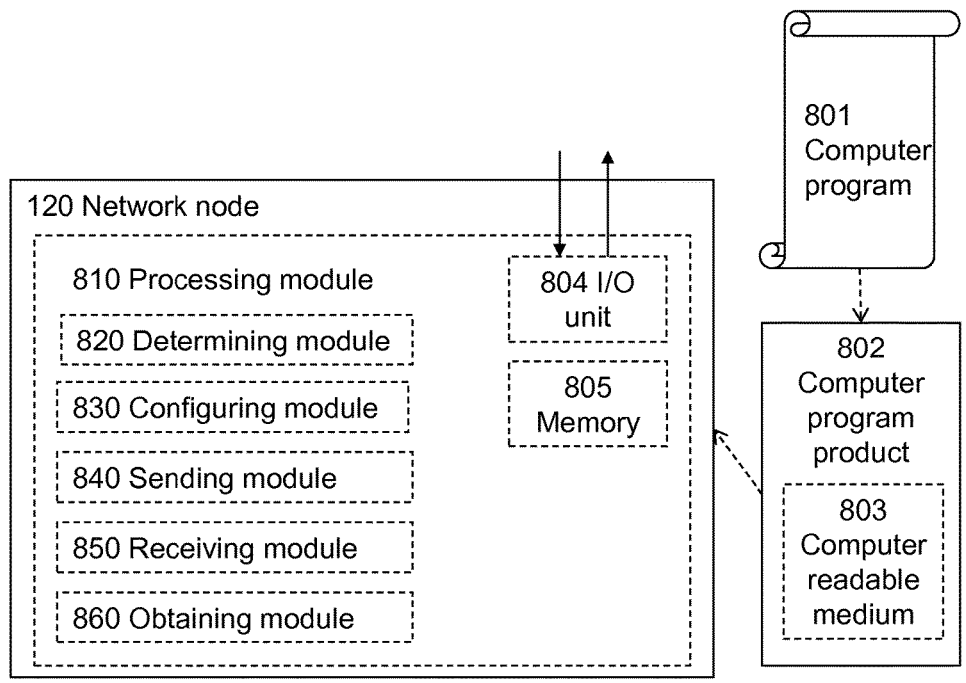
FIG. 8 is a block diagram illustrating embodiments of the network node.

With reference to FIG. 8, a schematic block diagram of the network node 120 is shown. The network node 120 is configured to perform the methods in FIGS. 6 and/or 7. Thus, the network node 120 is configured to manage an operational behavior of a wireless device 110.

As mentioned, the wireless network 100 may comprise the wireless device 110 and the network node 120.

Again, the operational behavior may comprise one of:
a first transmission behavior after the measurement gap, wherein the transmission behavior relates to that the wireless device 110 is allowed to transmit;
a second transmission behavior after the measurement gap, wherein the transmission behavior relates to that the wireless device 110 is forbidden to transmit;
a first reception behavior after the measurement gap, wherein the reception behavior relates to that the wireless device 110 is allowed to receive; and
a second reception behavior after the measurement gap, wherein the reception behavior relates to that the wireless device 110 is forbidden to receive.

According to some embodiments herein, the network node 120 may comprise a processing module 810. In further embodiments, the processing module 810 may comprise one or more of a determining module 820, configuring module 830, a sending module 840, a receiving module 850 and an obtaining module 860.

The network node 120 may further comprise an Input/output (I/O) unit 804 configured to send and/or receive the message, the capability, other messages, values, indications and the like as described herein. The I/O unit 804 may comprise the sending module 840, the receiving module 850, a transmitter and/or a receiver.

Furthermore, the network node 120 may comprise a memory 805 for storing software to be executed by, for example, the processing module when the processing module is implemented as a hardware module comprising at least one processor or the like.

FIG. 8 also illustrates software in the form of a computer program 801, comprising computer readable code units which when executed on the network node 120 causes the network node 120 to perform the method according to FIGS. 6 and/or 7.

Finally, FIG. 8 illustrates a computer program product 802, comprising computer readable medium 803 and the computer program 801 as described directly above stored on the computer readable medium 803.

Therefore, according to the various embodiments described above, the network node 120 is, e.g. by means of the processing module 810 and/or the determining module 820, operative to, e.g. configured to, determine the operational behavior of the wireless device 110 in at least one subframe occurring immediately after a measurement gap used by the wireless device 110 for performing radio measurements, wherein the determined operational behavior is based on one or more criteria relating to a scenario in which the wireless device 110 operates.

As mentioned, said one or more criteria may include one or more of:
a deployment scenario characterized by cell type and/or cell size of the wireless network 100;
a type of multi-carrier operation;
a frequency of usage of large timing alignment commands;
a number of carriers to measure in the measurement gap;
a frequency of usage of the measurement gap;
a signal quality of target cells;
a data rate requirement;
historical information relating to operational behavior; and the like.

The network node 120 is, e.g. by means of the processing module 810 and/or the configuring module 830, operative to, e.g. configured to, configure the wireless device 110 according to the determined operational behavior.

Furthermore, the network node 120 may be configured to serve the wireless device 110 on a multi-carrier including a first serving cell and a second serving cell, wherein the determined operational behavior may apply in the first serving cell. Then, the network node 120 may be, e.g. by means of the processing module 810 and/or the determining module 820, or a further determining module (not shown), operative to, e.g. configured to, determine a further operational behavior of the wireless device 110 in at least one subframe occurring immediately after a further measurement gap used by the wireless device 110 for performing radio measurements at the second serving cell. The further operational behavior may apply in the second serving cell.

The network node 120 may be, e.g. by means of the processing module 810 and/or the sending module 840, operative to, e.g. configured to, send, to a further network node, information related to the determined operational behavior of the wireless device 110.

The network node 120 may be, e.g. by means of the processing module 810 and/or the receiving module 850, operative to, e.g. configured to, receive an indication relating to said one or more criteria from a further network node 130. Then, the network node 120 may be, e.g. by means of the processing module 810 and/or the determining module 820, or yet another determining module (not shown), operative to, e.g. configured to, determine the operational behavior based on the indication.

Moreover, the network node 120 may be, e.g. by means of the processing module 810 and/or the receiving module 850, or a further receiving module (not shown), operative to, e.g. configured to, receive, from the wireless device 110, an indication about the wireless device's 110 capability relating to the operational behavior, which indication indicates whether or not the wireless device 110 is capable of being configured according to the determined operational behavior.

Figure 9:
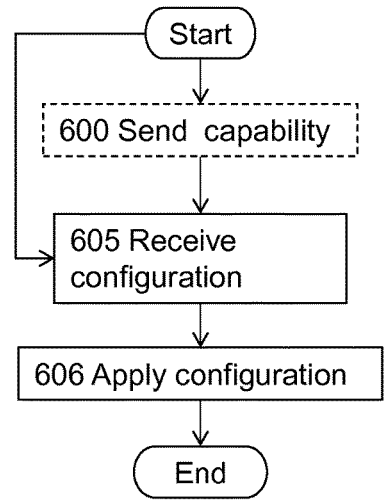
FIG. 9 is a flowchart illustrating embodiments of the method in the wireless device.

In FIG. 9, an exemplifying, schematic flowchart of the method in the wireless device 110 is shown. Thus, the wireless device 110 performs a method for managing a measurement gap used by the wireless device 110 for performing radio measurements, wherein the wireless device 110 is served by a network node 120. As mentioned, the same reference numerals have been reused to denote the same or similar action as in FIG. 6.

The following actions may be performed in any suitable order.

Action 600

The wireless device 110 may send, to the network node 120, an indication about the wireless device's capability relating to the operational behavior. The indication may indicate whether or not the wireless device 110 is capable of being configured according to the configuration of the operational behavior.

Action 605

The wireless device 110 receives, from the network node 120, a configuration of an operational behavior of the wireless device 110 in at least one subframe occurring immediately after the measurement gap.

The configuration may indicate that the operational behavior may comprise one of:
- a first transmission behavior after the measurement gap, wherein the transmission behavior relates to that the wireless device 110 is allowed to transmit;
- a second transmission behavior after the measurement gap, wherein the transmission behavior relates to that the wireless device 110 is forbidden to transmit;
- a first reception behavior after the measurement gap, wherein the reception behavior relates to that the wireless device 110 is allowed to receive; and
- a second reception behavior after the measurement gap, wherein the reception behavior relates to that the wireless device 110 is forbidden to receive.

Action 606

The wireless device 110 applies the configuration in the at least one subframe.

Figure 10:
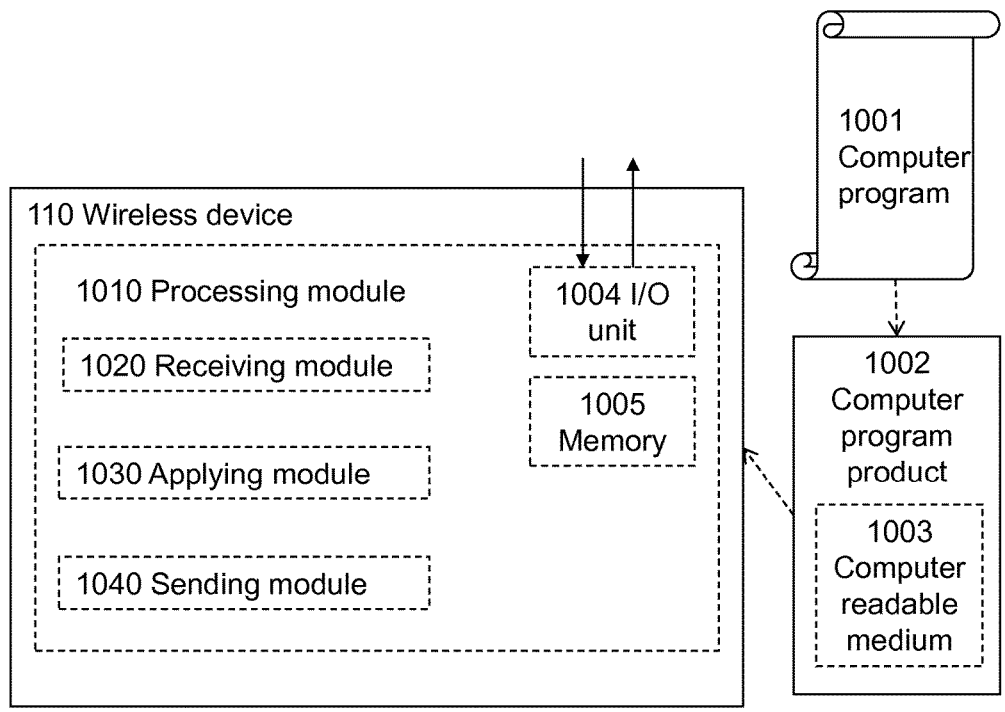
FIG. 10 is a block diagram illustrating embodiments of the wireless device.

With reference to FIG. 10, a schematic block diagram of the wireless device 110 is shown. The wireless device 110 is configured to perform the methods in FIG. 6 and/or FIG. 9. Accordingly, the wireless device 110 is configured to manage a measurement gap used by the wireless device 110 for performing radio measurements, wherein the wireless device 110 is configured to be served by a network node 120.

According to some embodiments herein, the wireless device 110 may comprise a processing module 1010. In further embodiments, the processing module 1010 may comprise one or more of a receiving module 1020, an operating module 1030 and a sending module 1040.

The wireless device 110 may further comprise an Input/output (I/O) unit 1004 configured to send and/or receive the message, the capability, other messages, values, indications and the like as described herein. The I/O unit 1004 may comprise the receiving module 1020, the sending module 1040, a transmitter and/or a receiver.

Furthermore, the wireless device 110 may comprise a memory 1005 for storing software to be executed by, for example, the processing module when the processing module is implemented as a hardware module comprising at least one processor or the like.

FIG. 10 also illustrates software in the form of a computer program 1001, comprising computer readable code units which when executed on the wireless device 110 causes the wireless device 110 to perform the method according to FIGS. 6 and/or 9.

Finally, FIG. 10 illustrates a computer program product 1002, comprising computer readable medium 1003 and the computer program 1001 as described directly above stored on the computer readable medium 1003.

Therefore, according to the various embodiments described above, the wireless device 110 is, e.g. by means of the processing module 1010 and/or the receiving module 1020, operative to, e.g. configured to, receive, from the network node 120, a configuration of an operational behavior of the wireless device 110 in at least one subframe occurring immediately after the measurement gap.

The configuration may indicate that the operational behavior may comprise one of:
- a first transmission behavior after the measurement gap, wherein the transmission behavior relates to that the wireless device 110 is allowed to transmit;
- a second transmission behavior after the measurement gap, wherein the transmission behavior relates to that the wireless device 110 is forbidden to transmit;
- a first reception behavior after the measurement gap, wherein the reception behavior relates to that the wireless device 110 is allowed to receive; and
- a second reception behavior after the measurement gap, wherein the reception behavior relates to that the wireless device 110 is forbidden to receive.

The wireless device 110 is, e.g. by means of the processing module 1010 and/or the applying module 1030, is operative to, e.g. configured to, apply the configuration in the at least one subframe.

The wireless device 110 may be, e.g. by means of the processing module 1010 and/or the sending module 1040, operative to, e.g. configured to, send, to the network node 120, an indication about the wireless device's 110 capability relating to the operational behavior, which indication indicates whether or not the wireless device is capable of being configured according to the configuration of the operational behavior.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a network node, for managing an operational behavior of a wireless device, the method comprising:
   receiving an indication relating to a capability of the wireless device to implement at least one of a plurality of operational behaviors;
   obtaining at least one criteria relating to a scenario in which the wireless device operates;
   determining a measurement gap length for use by the wireless device for performing radio measurements based on the obtained at least one criteria related to the scenario in which the wireless device operates;
   determining an operational behavior of the plurality of operational behaviors that the wireless device is to implement in the at least one subframe occurring immediately after the measurement gap based on the determined measurement gap length and the received indication relating to the capability of the wireless device; and
   configuring the wireless device to implement the determined operational behavior in the at least one subframe occurring immediately after the measurement gap.

2. The method of claim 1, wherein the network node serves the wireless device on a multi-carrier including a first serving cell and a second serving cell, wherein the determined operational behavior applies in the first serving cell; and
   the method further comprising determining another operational behavior of the plurality of operational behaviors that the wireless device is to implement in at least one subframe occurring immediately after a further measurement gap used by the wireless device for performing radio measurements at the second serving cell, the other operational behavior applies in the second serving cell and is based on the scenario in which the wireless device operates.

3. The method of claim 1, wherein said at least one criteria includes at least one of:
   a deployment scenario characterized by at least one of cell type and cell size of a wireless network;
   a type of multi-carrier operation;
   a frequency of usage of large timing alignment commands;
   a number of carriers to measure in the measurement gap;
   a frequency of usage of the measurement gap;
   a signal quality of target cells;
   a data rate requirement; and
   historical information relating to operational behavior.

4. The method of claim 1, wherein the operational behavior comprises one of:
   a first transmission behavior after the measurement gap, wherein the transmission behavior relates to that the wireless device is allowed to transmit;
   a second transmission behavior after the measurement gap, wherein the transmission behavior relates to that the wireless device is forbidden to transmit;
   a first reception behavior after the measurement gap, wherein the reception behavior relates to that the wireless device is allowed to receive; and
   a second reception behavior after the measurement gap, wherein the reception behavior relates to that the wireless device is forbidden to receive.

5. The method of claim 4, wherein the determining of the operational behavior comprises receiving an indication relating to said at least one criteria from a further network node, wherein the determining of the operational behavior is based on the indication.

6. The method of claim 1, wherein the method comprises:
   sending, to a further network node, information related to the determined operational behavior of the wireless device.

7. A method, performed by a wireless device, for managing an operational behavior of the wireless device, the method comprising:
   transmitting an indication relating to a capability of the wireless device to implement at least one of a plurality of operational behaviors;
   receiving, from the network node, a configuration of an operational behavior of the plurality of operational behaviors that the wireless device is to implement in the at least one subframe occurring immediately after the measurement gap the configuration of the operational behavior of the plurality of operational behaviors being based on a measurement gap length and the transmitted indication relating to the capability of the wireless device, the measurement gap length being based on at least one criteria related to a scenario in which the wireless device operates; and
   applying the configuration of the operational behavior of the plurality of operational behaviors in the at least one subframe occurring immediately after the measurement gap.

8. The method of claim 7, wherein the configuration indicates that the operational behavior comprises one of:
   a first transmission behavior after the measurement gap, wherein the transmission behavior relates to that the wireless device is allowed to transmit;
   a second transmission behavior after the measurement gap, wherein the transmission behavior relates to that the wireless device is forbidden to transmit;
   a first reception behavior after the measurement gap, wherein the reception behavior relates to that the wireless device is allowed to receive; and
   a second reception behavior after the measurement gap, wherein the reception behavior relates to that the wireless device is forbidden to receive.

9. A network node configured to manage an operational behavior of a wireless device, wherein the network node includes processing circuitry configured to:
   receive an indication relating to a capability of the wireless device to implement at least one of a plurality of operational behaviors;
   obtain at least one criteria relating to a scenario in which the wireless device operates;
   determine a measurement gap length for use by the wireless device for performing radio measurements based on the obtained at least one criteria related to the scenario in which the wireless device operates;
   determine an operational behavior of the plurality of operational behaviors that the wireless device is to implement in the at least one subframe occurring immediately after the measurement gap based on the determined measurement gap length and the received indication relating to the capability of the wireless device; and
   configure the wireless device to implement the determined operational behavior in the at least one subframe occurring immediately after the measurement gap.

10. The network node of claim 9, wherein the processing circuitry is further configured to serve the wireless device on a multi-carrier including a first serving cell and a second serving cell, wherein the determined operational behavior applies in the first serving cell, and wherein the processing circuitry is further configured to determine another operational behavior of the plurality of operational behaviors that the wireless device is to implement in at least one subframe occurring immediately after a further measurement gap used by the wireless device for performing radio measurements at the second serving cell, the other operational behavior applies in the second serving cell and is based on the scenario in which the wireless device operates.

11. The network node of claim 9, wherein said at least one criteria includes at least one of:
 a deployment scenario characterized by at least one of cell type and cell size of a wireless network;
 a type of multi-carrier operation;
 a frequency of usage of large timing alignment commands;
 a number of carriers to measure in the measurement gap;
 a frequency of usage of the measurement gap;
 a signal quality of target cells;
 a data rate requirement; and
 historical information relating to operational behavior.

12. The network node of claim 9, wherein the operational behavior comprises one of:
 a first transmission behavior after the measurement gap, wherein the transmission behavior relates to that the wireless device is allowed to transmit;
 a second transmission behavior after the measurement gap, wherein the transmission behavior relates to that the wireless device is forbidden to transmit;
 a first reception behavior after the measurement gap, wherein the reception behavior relates to that the wireless device is allowed to receive; and
 a second reception behavior after the measurement gap, wherein the reception behavior relates to that the wireless device is forbidden to receive.

13. The network node of claim 12, wherein the processing circuitry is further configured to receive an indication relating to said at least one criteria from a further network node, wherein the network node is configured to determine the operational behavior based on the indication from the further network node.

14. The network node of claim 9, wherein the processing circuitry is further configured to send, to a further network node, information related to the determined operational behavior of the wireless device.

15. A wireless device configured to manage an operational behavior of the wireless device the wireless device includes processing circuitry configured to:
 transmit an indication relating to a capability of the wireless device to implement at least one of a plurality of operational behaviors;
 receive, from the network node, a configuration of an operational behavior of the plurality of operational behaviors that the wireless device is to implement in at least one subframe occurring immediately after the measurement gap, the configuration of the operational behavior of the plurality of operational behaviors being based on a measurement gap length and the transmitted indication relating to the capability of the wireless device, the measurement gap length being based on at least one criteria related to a scenario in which the wireless device operates; and
 apply the configuration of the operational behavior of the plurality of operational behaviors in the at least one subframe occurring immediately after the measurement gap.

16. The wireless device of claim 15, wherein the configuration indicates that the operational behavior comprises one of:
 a first transmission behavior after the measurement gap, wherein the transmission behavior relates to that the wireless device is allowed to transmit;
 a second transmission behavior after the measurement gap, wherein the transmission behavior relates to that the wireless device is forbidden to transmit;
 a first reception behavior after the measurement gap, wherein the reception behavior relates to that the wireless device is allowed to receive; and
 a second reception behavior after the measurement gap, wherein the reception behavior relates to that the wireless device is forbidden to receive.

17. A computer program product, comprising a non-transitory computer readable medium having computer readable code units which when executed on a network node cause the network node to:
 receive an indication relating to a capability of the wireless device to implement one of a plurality of operational behaviors;
 obtain at least one criteria relating to a scenario in which the wireless device operates;
 determine a measurement gap length for use by the wireless device for performing radio measurements based on the obtained at least one criteria related to the scenario in which the wireless device operates;
 determine an operational behavior of the plurality of operational behaviors that the wireless device is to implement in the at least one subframe occurring immediately after the measurement gap based on the determined measurement gap length and the received indication relating to the capability of the wireless device; and
 configure the wireless device to implement the determined operational behavior in the at least one subframe occurring immediately after the measurement gap.

18. A computer program product for a wireless device for performing an operational behavior the computer program product comprising a non-transitory computer readable medium having computer readable code units which when executed on a wireless device cause the wireless device to:
 transmit an indication relating to a capability of the wireless device to implement at least one of a plurality of operational behaviors;
 receive, from a network node, a configuration of an operational behavior of the plurality of operational behaviors that the wireless device is to implement in at least one subframe occurring immediately after the measurement gap, the configuration of the operational behavior of the plurality of operational behaviors being based on a measurement gap length and the transmitted indication relating to the capability of the wireless device, the measurement gap length being based on at least one criteria related to a scenario in which the wireless device operates; and
 apply the configuration of the operational behavior of the plurality of operational behaviors in the at least one subframe occurring immediately after the measurement gap.

* * * * *